(No Model.) 2 Sheets—Sheet 2.

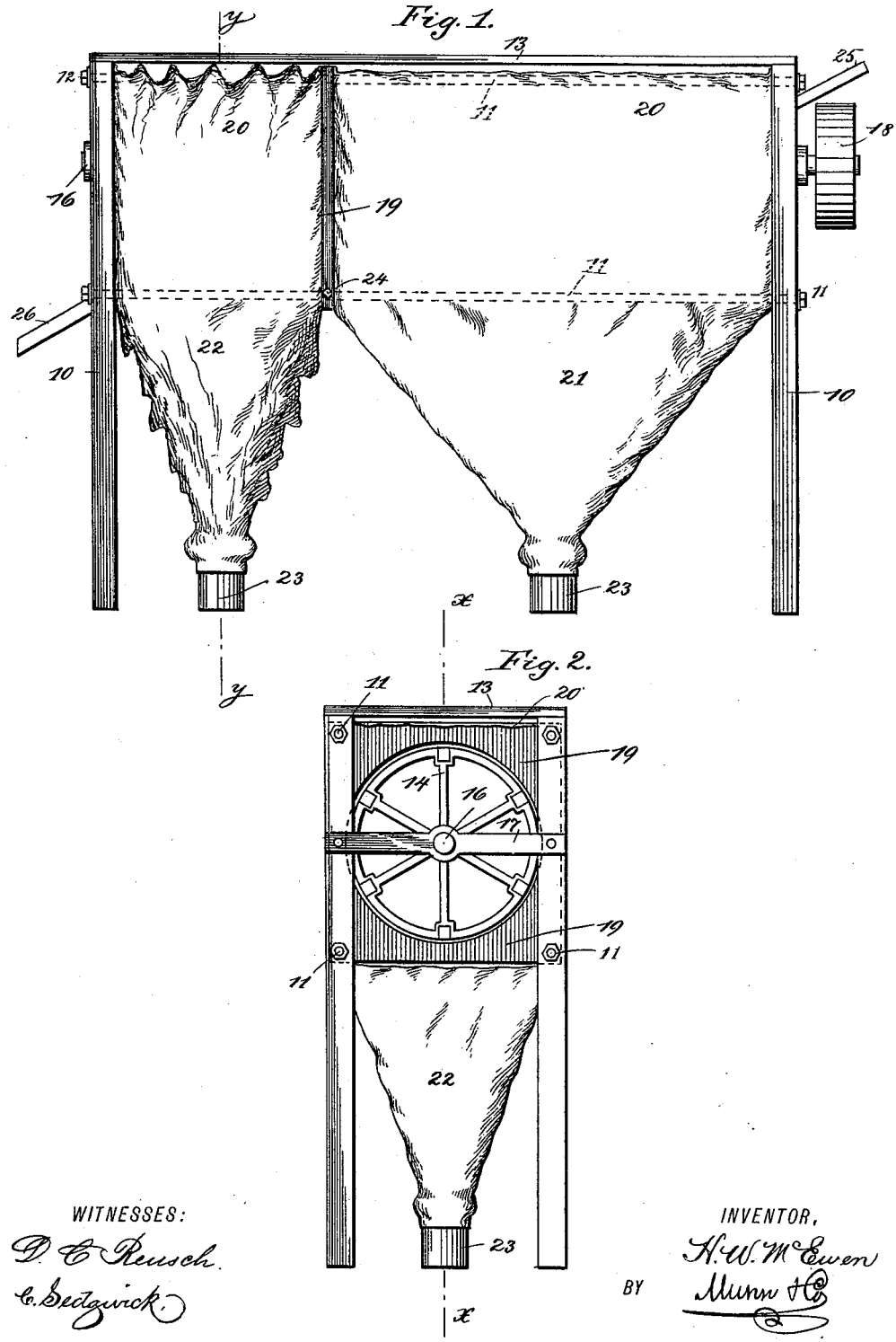

H. W. McEWEN.
BOLTING CHEST.

No. 404,100. Patented May 28, 1889.

WITNESSES:
D. C. Reusch
C. Sedgwick

INVENTOR,
H. W. McEwen
BY
Munn & Co.
ATTORNEYS.

UNITED STATES PATENT OFFICE.

HUGH W. McEWEN, OF TIVERTON, ONTARIO, CANADA.

BOLTING-CHEST.

SPECIFICATION forming part of Letters Patent No. 404,100, dated May 28, 1889.

Application filed January 25, 1889. Serial No. 297,513. (No model.)

*To all whom it may concern:*

Be it known that I, HUGH W. MCEWEN, of Tiverton, in the Province of Ontario and Dominion of Canada, have invented a new and useful Improvement in Bolting-Chests, of which the following is a full, clear, and exact description.

My invention relates to an improvement in bolting-chests, and has for its object to provide a simple and effective means for cutting off the product at any desired point; and a further object of the invention is to provide a durable and effective bolting-chest at a minimum cost.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 3:
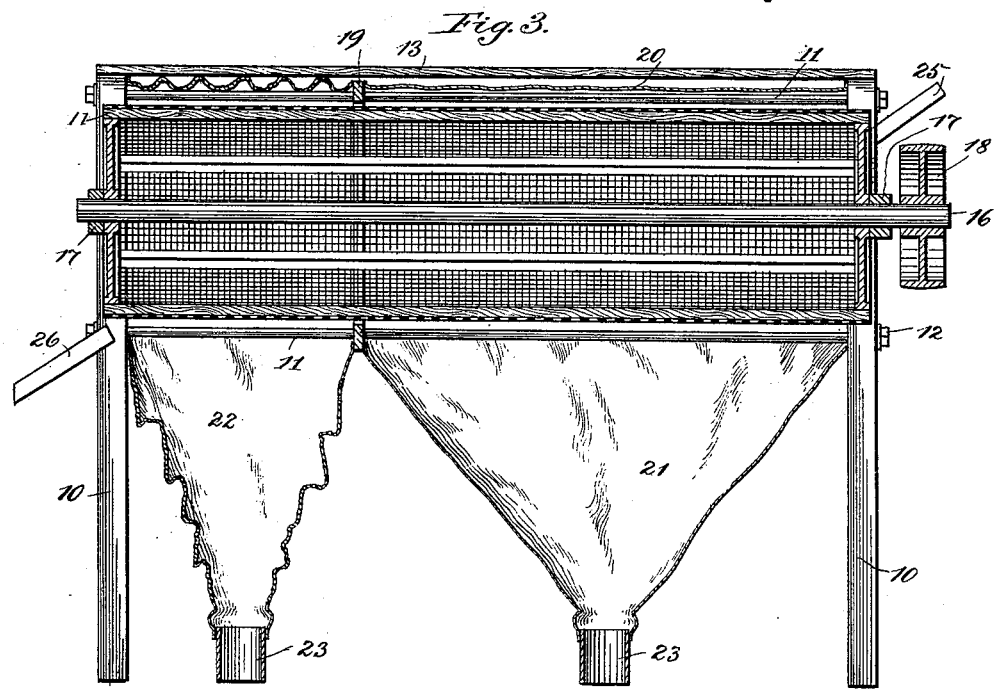

Figure 1 is a side elevation of the chest. Fig. 2 is an end view. Fig. 3 is a longitudinal vertical section on line $x\ x$ of Fig. 2, and Fig. 4 is a transverse section on line $y\ y$ of Fig. 1.

In carrying out the invention the chest-frame consists, preferably, of four posts or standards, 10, connected by four rods, 11, one rod being passed through each opposing standard at or near the center and one at the top. The rods 11 are preferably threaded upon their outer extremities and secured in place by suitable lock-nuts, 12. The upper ends of the said standards are further connected by a cover, 13, of wood or other suitable material, which cover extends from side to side and end to end of the frame formed by the connected standards.

Figure 4:
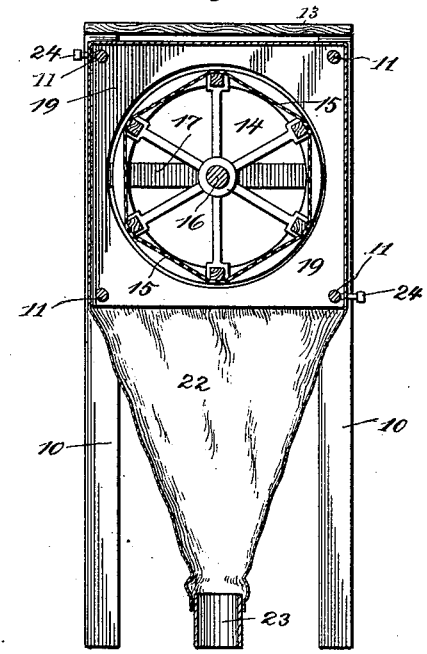

Between the upper and lower rods 11 a reel, 14, is located, which reel may be of any suitable or approved construction and covered with any desired number of bolt-cloth, 15, as best shown in Figs. 3 and 4.

The reel 14 is provided with an attached central longitudinal shaft, 16, which shaft, passing through the frame, is journaled in bracket-bearings 17, extending transversely of the frame and secured to the outer face of the several standards 10, as best shown in Figs. 2 and 4. One extremity of the reel-shaft 16 is provided with a drive-pulley, 18, whereby the reel is rotated.

Upon the several rods 11 a cut-off, 19, is held to slide, consisting of a rectangular plate bored centrally to receive the reel and provided with a suitable aperture near each corner, through which the rods 11 are passed.

The covering of the bolting-chest consists of a strip or strips of any closely-woven cloth, 20, secured rigidly to the inner faces of the several standards at or near the top and below the wooden cover 13, and also to the upper edge of the cut-off 19. The cloth 20 is further attached to the inner longitudinal face of the standards and to the opposite side edges of the cut-off, whereby two compartments, 21 and 22, are obtained. At each side of the cut-off and below the lower rods 11 the cloth is contracted and carried downward in essentially a funnel shape, and in the lower extremity of each funnel thus formed a metal sleeve, 23, is preferably secured, as best illustrated in Figs. 1 and 3.

In attaching the cloth forming the several covered compartments 21 and 22 sufficient fullness is allowed to permit of the free movement of the cut-off upon the rods 11 in the direction of either end of the frame.

By this construction it will be observed that the covering of the chest is essentially entirely of cloth, and that the same may be produced at a minimum cost and the entire machine constructed in a simple yet durable manner.

The cut-off 19 is provided with one or more set-screws, 24, as shown in Fig. 4, which set-screws are adapted to bind against one or more of the rods 11 and retain the cut-off in the position in which it is placed by the operator.

In operation the chop is passed through a suitable chute, 25, at the front of the machine into the reel 14, and the offal or tailings find their exit through a proper chute, 26, leading from the rear of the reel, as illustrated in Fig. 3. After the chop has been introduced into the reel the cut-off, if moved forward, will contract the compartment 21 and enlarge the compartment 22, the compartment 21, which is located beneath the forward end of the reel, being the fine-flour compartment, and the compartment 22, located under the rear of the reel, being the middlings-compartment. It will be understood that when the chop is in the reel the fine flour will be sifted through the said reel at the forward end, and that as the chop approaches the center of the reel the grade of flour delivered therefrom will become more or less coarse. Thus by carrying the cut-off in the direction of the front of the reel a suitable distance only the finest of the flour will pass down through the chute 21, while the coarser particles will find an exit with the middlings through the chute 22.

It is evident that if an inferior grade of flour is to be produced the cut-off may be moved toward the rear a sufficient distance to permit any desired amount of the coarser particles to pass down into the chute 21 with the fine flour and the middlings be made to pass out through the chute 22.

Having thus described my invention, what I claim as new, and desire to secure by Letters Patent, is—

1. The combination, with a bolting-chest and a cloth covering terminating at the under side in offtake-chutes, of a horizontally-adjustable cut-off attached to the cloth covering and dividing the chutes, substantially as shown and described.

2. The combination, with a bolting-chest and a cloth covering terminating at the under side in offtake-chutes, of upper and lower rods passing longitudinally through the chest within the covering, and a cut-off held to slide upon the said rods, attached to said covering, and dividing the said offtake-chutes, substantially as and for the purpose specified.

3. The combination, with a bolting-chest and a cloth covering terminating at the under side in offtake-chutes, of a reel journaled in the frame of the chute within the covering, and a cut-off consisting of a plate centrally bored to receive the reel, held to slide upon the said rods, and having attached thereto at opposite sides the cloth constituting the covering of the chest, whereby the offtake-chutes are divided, substantially as and for the purpose specified.

4. The combination, with a bolting-chest and a cloth covering terminating at the under side in offtake-chutes, of a reel journaled in the frame of the chest within the covering, rods passing longitudinally and horizontally through the chest above and below the reel and within the covering, a cut-off consisting of a plate centrally bored to receive the reel, held to slide upon the said rods, and having attached thereto at opposite sides the cloth constituting the covering of the chest, whereby the offtake-chutes are divided, set-screws passing through the cut-off and contacting with the said rods, and a rigid cover attached to the ends of the bolting-chest and covering the top of the same, substantially as shown and described.

HUGH W. McEWEN.

Witnesses:
R. B. DAVEY,
J. C. McEWEN.